(12) United States Patent
Zhang et al.

(10) Patent No.: US 11,618,819 B2
(45) Date of Patent: Apr. 4, 2023

(54) THERMOPLASTIC ENERGY ABSORBING COMPOSITES AND METHODS OF PREPARATION THEREOF

(71) Applicant: Nano and Advanced Materials Institute Limited, Hong Kong (CN)

(72) Inventors: Kang Zhang, Hong Kong (CN); Christopher Cheung Yee, Hong Kong (CN); Xiyao Zhang, Hong Kong (CN); Jian Zhang, Hong Kong (CN); Shilong Zhang, Hong Kong (CN); Jifan Li, Hong Kong (CN)

(73) Assignee: Nano and Advanced Materials Institute Limited, Hong Kong (HK)

( * ) Notice: Subject to any disclaimer, the term of this patent is extended or adjusted under 35 U.S.C. 154(b) by 164 days.

(21) Appl. No.: 17/248,557

(22) Filed: Jan. 29, 2021

(65) Prior Publication Data
US 2021/0238406 A1  Aug. 5, 2021

Related U.S. Application Data

(60) Provisional application No. 62/967,629, filed on Jan. 30, 2020.

(51) Int. Cl.
| | | |
|---|---|---|
| *C08L 51/08* | (2006.01) | |
| *C08K 5/00* | (2006.01) | |
| *C08K 3/013* | (2018.01) | |
| *C08K 5/5419* | (2006.01) | |

(52) U.S. Cl.
CPC ............ *C08L 51/085* (2013.01); *C08K 3/013* (2018.01); *C08K 5/005* (2013.01); *C08K 5/0025* (2013.01); *C08K 5/5419* (2013.01); *C08L 2207/53* (2013.01)

(58) Field of Classification Search
CPC ... C08L 51/085; C08L 2207/53; C08K 3/013; C08K 5/0025; C08K 5/005; C08K 5/5419
USPC ......................................................... 523/201
See application file for complete search history.

(56) References Cited

U.S. PATENT DOCUMENTS

| | | | |
|---|---|---|---|
| 9,375,041 B2 | 6/2016 | Plant | |
| 2007/0029690 A1* | 2/2007 | Green | ........................ C08J 5/00 525/191 |
| 2011/0047819 A1* | 3/2011 | Pelletier | ................. A43B 17/14 36/43 |

FOREIGN PATENT DOCUMENTS

| | | | | |
|---|---|---|---|---|
| CN | 1813032 A | 8/2006 | | |
| CN | 101016388 A | 8/2007 | | |
| CN | 106751727 A | 5/2017 | | |
| CN | 109082104 A | * 12/2018 | .............. | C08L 75/04 |
| WO | WO-2010072812 A1 | * 7/2010 | .............. | A41D 31/00 |

OTHER PUBLICATIONS

Li et al., CN 109082104 A machine translation in English, Dec. 25, 2018 (Year: 2018).*
Office Action of CN 202110134662.8 issued from the China National Intellectual Property Administration (CNIPA) dated Mar. 3, 2022.

* cited by examiner

*Primary Examiner* — David T Karst
(74) *Attorney, Agent, or Firm* — S&F/WEHRW

(57) ABSTRACT

Provided herein are energy absorbing composites including a thermoplastic resin, a dilatant, a compatibilizer, a reinforcing filler, and optionally an antioxidant and methods of preparation thereof.

19 Claims, 7 Drawing Sheets

THERMOPLASTIC ENERGY ABSORBING COMPOSITES AND METHODS OF PREPARATION THEREOF

CROSS-REFERENCE TO RELATED APPLICATIONS

This application claims priority from U.S. Provisional Patent Application No. 62/967,629, filed on Jan. 30, 2020, which is incorporated herein by reference in its entirety

TECHNICAL FIELD

The present disclosure generally relates to the field of polymers. More particularly, the present disclosure relates to thermoplastic energy absorbing materials and methods of preparation and use thereof.

BACKGROUND

Energy absorbing composites generally absorb kinetic mechanical energy by compressing or deflecting at a relatively constant stress over a given distance without rebound. Conventional energy absorbing composites typically employ elastomer foams or similar resiliently compressible materials. However, these materials typically provide limited protection as an absorbed force cannot be distributed over a larger surface area thereby. Energy absorbing composites comprising shear thickening materials have been developed to distribute absorbed forces over larger surface areas. Shear thickening materials are able to viscously flow at low rates of deformation, but at higher deformation rates, the material becomes stiff allowing the absorbed force to be distributed across the surface of the rigid material to a greater area of elastomeric material.

The mechanical properties of the base polymer of the energy absorbing composites comprising shear thickening materials can be negatively affected by incorporation of the shear thickening material and the resulting composites can be further disadvantaged by reduced reprocessability.

As a result, there is a need for improved energy absorbing composites that overcome at least some of the aforementioned disadvantages.

SUMMARY

In a first aspect, provided herein is an energy absorbing composite comprising: a thermoplastic resin; a dilatant; a compatibilizer, a reinforcing filler, and optionally an antioxidant.

In a first embodiment, provided herein is the composite of the first aspect, wherein the thermoplastic resin is selected from the group consisting of polycarbonate (PC), polyamide (PA), thermoplastic polyester, thermoplastic polyurethane (TPU), acrylonitrile butadiene styrene (ABS), styrene-ethylene-butylene-styrene (SEBS), styrene-butadiene-styrene (SBS), polyethylene (PE), ethylene vinyl acetate co-polymer (EVA), polypropylene (PP), and combinations thereof.

In a second embodiment, provided herein is the composite of the first aspect, wherein the dilatant is a silicon polymer, a hydroxyl terminated dialkylsiloxane polymer, a borate cross-linked hydroxyl terminated dialkylsiloxane polymer, a silicone polymer comprising borated polydimethylsiloxane, polyborodimethylsiloxane (PBDMS), or a combination thereof.

In a third embodiment, provided herein is the composite of the first aspect, wherein the reinforcing filler is selected from the group consisting of fumed silica, E-glass fiber, wollastonite, quartz, hydrophobic fumed silica, diatomaceous earth, calcium carbonate, and combinations thereof.

In a fourth embodiment, provided herein is the composite of the first aspect, wherein the compatibilizer is selected from the group consisting of glycidyl methacrylate, poly(ethylene-co-methyl acrylate-co-glycidyl methacrylate) (EGMA), glycidyl methacrylate (GMA), triethoxyvinylsilane, and maleic anhydride (MA).

In a fifth embodiment, provided herein is the composite of the first aspect, further comprising a siloxane cross linker.

In a sixth embodiment, provided herein is the composite of the first aspect, wherein the thermoplastic resin, the dilatant, the compatibilizer, the reinforcing filler, and the antioxidant are present in the composite in a weight ratio between 100:1:0.01:0.02:0 to 100:120:3:20:2, respectively.

In a seventh embodiment, provided herein is the composite of the first aspect, wherein the thermoplastic resin, the dilatant, the compatibilizer, the reinforcing filler, and the antioxidant are present in the composite in a weight ratio between 100:10:1:1:0.5 to 100:40:3:12:1.5, respectively.

In an eighth embodiment, provided herein is the composite of the first embodiment of the first aspect, wherein the dilatant is PBDMS, the reinforcing filler is fumed silica, E-glass fiber, wollastonite, quartz, hydrophobic fumed silica, diatomaceous earth, or calcium carbonate, and the antioxidant is a phenolic antioxidant.

In a ninth embodiment, provided herein is the composite of the eighth embodiment of the first aspect, wherein the thermoplastic resin, the dilatant, the compatibilizer, the reinforcing filler, and the antioxidant are present in the composite in a weight ratio between 100:10:1:1:0.5 to 100:40:3:12:1.5, respectively.

In a tenth embodiment, provided herein is the composite of the ninth embodiment of the first aspect, further comprising a siloxane cross linker, wherein the thermoplastic resin and cross linker are present in the composite in a weight ratio between 100:1 to 100:5.

In an eleventh embodiment, provided herein is the composite of the first aspect, further comprising a core-shell polymer, wherein the core-shell polymer comprises the dilatant in the core.

In a twelfth embodiment, provided herein is the composite of the eleventh embodiment of the first aspect, wherein the dilatant is a silicon polymer, a hydroxyl terminated dialkylsiloxane polymer, a borate cross-linked hydroxyl terminated dialkylsiloxane polymer, a silicone polymer comprising borated polydimethylsiloxane, PBDMS, or a combination thereof.

In a thirteenth embodiment, provided herein is the composite of the twelfth embodiment of the first aspect, wherein the core-shell polymer has an average diameter between 50 nm and 10 μm.

In a fourteenth embodiment, provided herein is the composite of the thirteenth embodiment of the first aspect, wherein the thermoplastic resin is polycarbonate, thermoplastic polyurethane, ABS, SEBS, SBS, polyethylene, ethylene vinyl acetate co-polymer, or combinations thereof.

In a fifteenth embodiment, provided herein is the composite of the fourteenth embodiment of the first aspect, wherein the shell comprises a hydrophobic polymer comprising repeating units selected from the group consisting of an alkyl methacrylate, an alkyl acrylate, polystyrene, allyl methacrylate, and combinations thereof.

In a sixteenth embodiment, provided herein is the composite of the fifteenth embodiment of the first aspect, wherein the hydrophobic polymer and the PBDMS are present in the thermoplastic in a mass ratio between 1:1 and 5:1, respectively.

In a seventeenth embodiment, provided herein is the composite of the sixteenth embodiment of the first aspect, wherein the core-shell polymer comprising PBDMS is present in the thermoplastic composite in a weight percentage up 50% by weight.

In a second aspect, provided herein is a method of preparing the composite of the first aspect, the method comprising: melt mixing the thermoplastic resin, the dilatant, the compatibilizer, the reinforcing filler, and optionally the antioxidant thereby forming the composite.

In a first embodiment of the second aspect, provided herein is the method of the second aspect, wherein the mixing occurs at a temperature between 60° C. to 250° C.

In a second embodiment of the second aspect, provided herein is the method of the second aspect, further comprising the step of cross linking the composite using a hydrosiloxane cross linker and a hydrosilylation catalyst to the thermoplastic resin, the dilatant, the compatibilizer, the reinforcing filler, and optionally the antioxidant.

In a second aspect, provided herein is a method of preparing the composite of the eleventh embodiment of the first aspect, the method comprising: melt mixing the thermoplastic resin, the core-shell polymer, and optionally the antioxidant thereby forming the composite.

In a first embodiment of the second aspect, provided herein is the method of the second aspect, further comprising the step of mixing the dilatant, hydrophobic monomers, and a radical initiator thereby forming the core-shell polymer.

BRIEF DESCRIPTION OF THE DRAWINGS

The above and other objects and features of the present disclosure will become apparent from the following description of the disclosure, when taken in conjunction with the accompanying drawings, in which.

DETAILED DESCRIPTION

Figure 1:
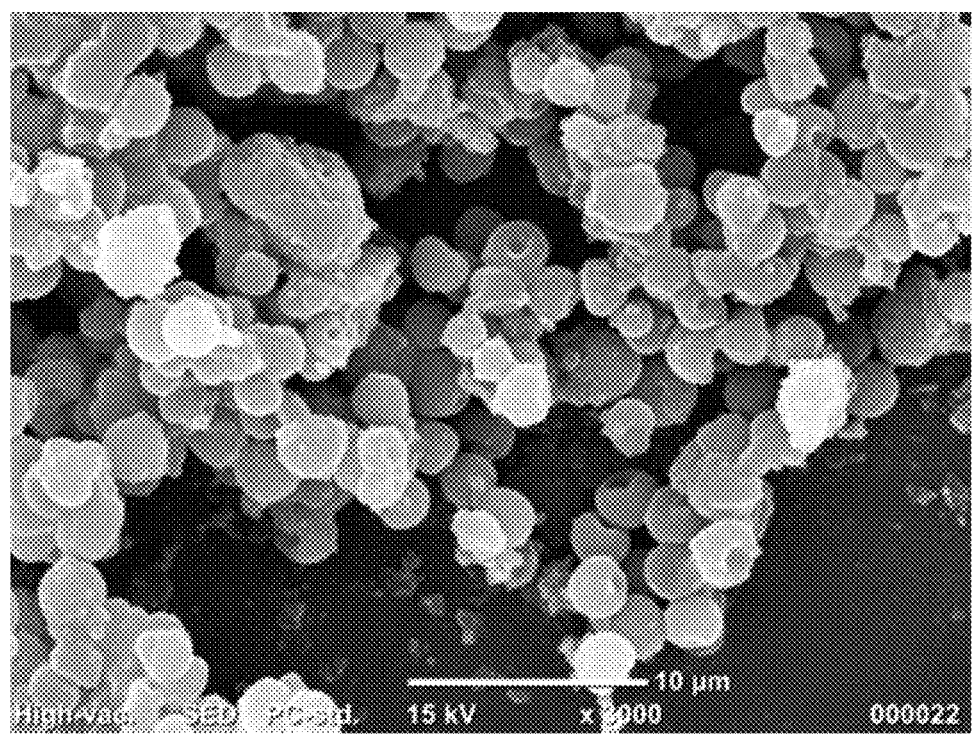
FIG. 1 depicts a scanning electron microscopy (SEM) image of polymethylmethacrylate (PMMA) core-shell structure comprising PBDMS in the core.
Figure 2:
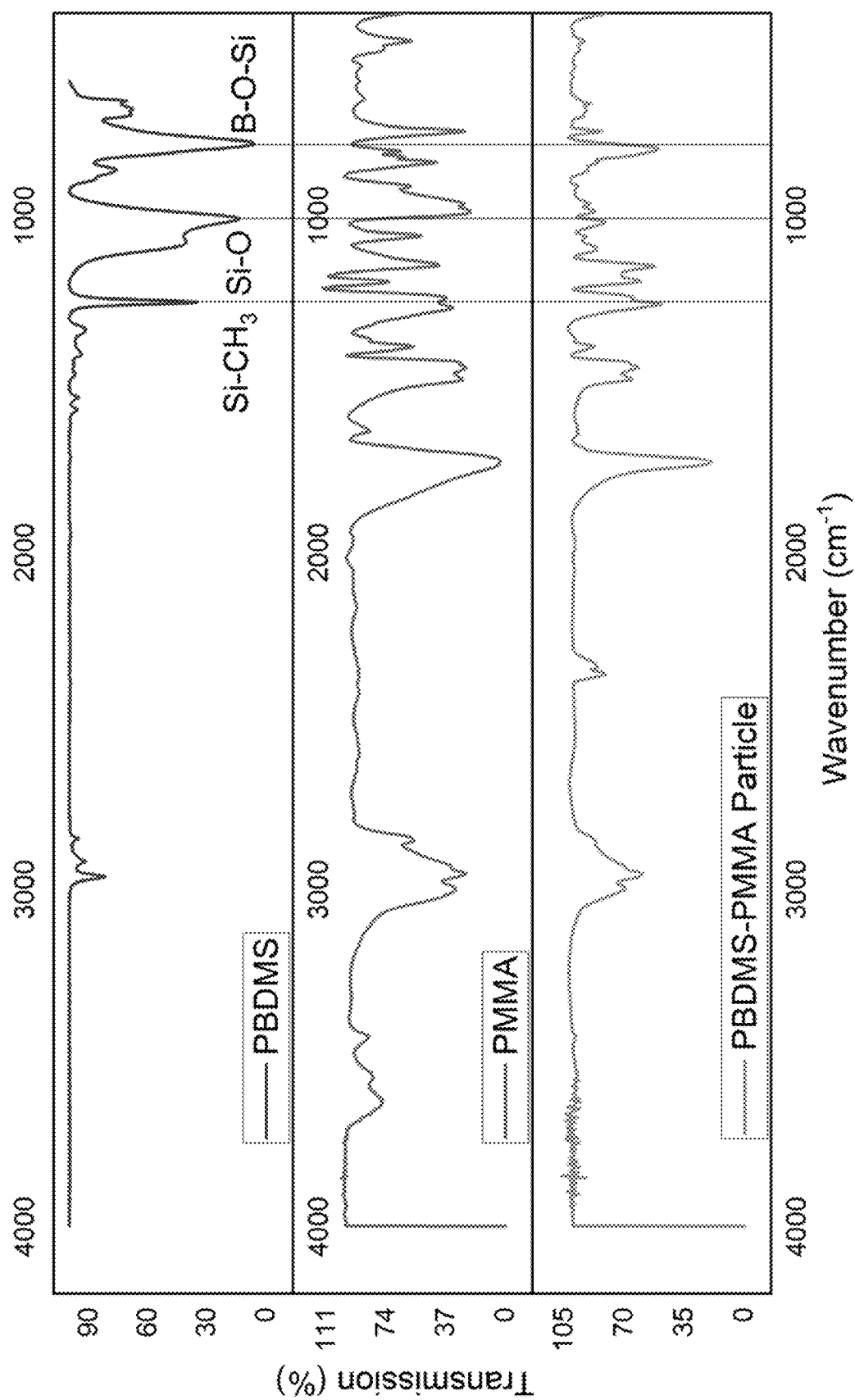
FIG. 2 depicts Fourier-transform infrared spectroscopy (FTIR) spectra of PBDMS (top), PMMA (middle), and a PMMA core-shell structure comprising PBDMS in the core (bottom).

Provided herein are energy absorbing composites having improved mechanical properties. The energy absorbing composites described herein can be prepared using a base thermoplastic resin and the resulting composite can have tensile strength, elongation at break, flexural strength and hardness similar to the pure base thermoplastic resin. In certain embodiments, the energy absorbing composites are reprocessable.

Definitions

As used herein, a "polymeric compound" (or "polymer") refers to a molecule including a plurality of one or more repeating units connected by covalent chemical bonds. A polymeric compound can be represented by General Formula I:

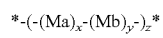  General Formula I wherein each Ma and Mb is a repeating unit or monomer. The polymeric compound can have only one type of repeating unit as well as two or more types of different repeating units. When a polymeric compound has only one type of repeating unit, it can be referred to as a homopolymer. When a polymeric compound has two or more types of different repeating units, the term "copolymer" or "copolymeric compound" can be used instead. For example, a copolymeric compound can include repeating units where Ma and Mb represent two different repeating units. Unless specified otherwise, the assembly of the repeating units in the copolymer can be head-to-tail, head-to-head, or tail-to-tail. In addition, unless specified otherwise, the copolymer can be a random copolymer, an alternating copolymer, or a block copolymer. For example, General Formula I can be used to represent a copolymer of Ma and Mb having x mole fraction of Ma and y mole fraction of Mb in the copolymer, where the manner in which comonomers Ma and Mb is repeated can be alternating, random, regiorandom, regioregular, or in blocks, with up to z comonomers present. In addition to its composition, a polymeric compound can be further characterized by its degree of polymerization (n) and molar mass (e.g., number average molecular weight (M) and/or weight average molecular weight (Mw) depending on the measuring technique(s)). The polymers described herein can exist in numerous stereochemical configurations, such as isotactic, syndiotactic, atactic, or a combination thereof.

As used herein, the term "melt blending" involves the use of shear force, extensional force, compressive force, ultrasonic energy, electromagnetic energy, thermal energy or combinations thereof and is conducted in processing equipment, wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

As used herein, the term "dilatant" will refer to, for example, a fluid whose viscosity is temporarily or permanently increased upon application of a shear force. In some embodiments herein, the term "dilatant" may be used synonymously with the term "shear thickening fluid."

Provided herein are energy absorbing composites with improved mechanical properties. The energy absorbing composites described herein can include agents that can improve miscibility of the dilatant and the thermoplastic resin, such as compatibilizer or a core-shell polymer. In certain embodiments, the energy absorbing composite comprises: a thermoplastic resin; a dilatant; a compatibilizer, a reinforcing filler, and optionally an antioxidant.

The energy absorbing composite described herein are not limited to any particular type of thermoplastic resin. Depending on the desired physical and chemical properties of the resulting energy absorbing composite, a person skilled in the art can select the appropriate thermoplastic resin. Exemplary thermoplastic resins include crystalline or semi-crystalline, or crystallizable, polyolefins, polyurethanes, polyimides, polyesters, poly(phenylene ether), polycarbonates, styrene-acrylonitrile copolymers, polyethylene terephthalate, polybutylene terephthalate, polystyrene, polystyrene derivatives, polyolefin-polystyrene copolymers (SBS, SEBS, etc.), polyphenylene oxide, polyoxymethylene, and polyolefin-vinyl acetate copolymers. In certain embodiments, the thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene, styrene, or mixtures thereof are also contemplated. The thermoplastic resin can comprise a branched polymer, a linear polymer, or a dendritic polymer. The thermoplastic resin can comprise a block, alternating, random, regiorandom, or regioregular polymer. The thermoplastic resin can comprise an isotactic polymer, syndiotactic polymer, atactic polymer, or a combination thereof.

In certain embodiments, the thermoplastic resin is selected from the group consisting of polycarbonate, thermoplastic polyurethane, styrene isoprene styrene (SIS), ABS, SEBS, SBS, polyethylene, ethylene vinyl acetate co-polymer, or combinations thereof.

The dilatant can be a non-Newtonian material, such as a shear-thickening fluid. In certain embodiments, the dilatant is a silicone polymer, such as hydroxyl terminated dialkylsiloxane polymer. In certain embodiments, the dilatant is a borate cross-linked hydroxyl terminated dialkylsiloxane polymer. Exemplary dilatants include PBDMS and any silicon comprising any silicone containing borated PDMS. In certain embodiments, the dilatant is PBDMS prepared from 2,000 to 4,000 or 2,000 to 3,500 Dalton hydroxyl terminated dimethylsiloxane polymer.

Any known reinforcing filler may be used, for example, aluminum powder, copper powder, silver powder, nickel powder, gold powder, alumina powder, zinc oxide powder, magnesium oxide powder, aluminum nitride powder, boron nitride powder, silicon nitride powder, diamond powder, carbon powder, indium, gallium, and combinations thereof. In certain embodiments, the reinforcing filler is fumed silica, E-glass fiber, wollastonite, quartz, hydrophobic fumed silica, diatomaceous earth, calcium carbonate, or a combination thereof.

The reinforcing filler can comprise particles, fibers, or a mixture thereof. The reinforcing filler can be between 1 μm to 50 μm measured along its longest dimension. In certain embodiments, the reinforcing filler can be between 1 μm to 40 μm; 1 μm to 30 μm; 1 μm to 20 μm; 2 μm to 20 μm; or 2 μm to 15 μm measured along its longest dimension. In certain embodiments, the reinforcing filler is selected from the group consisting of wollastonite, E-glass fiber, quartz, and hydrophobic fumed silica; and the reinforcing filler is between 2 μm to 15 μm measured along its longest dimension.

The reinforcing filler can comprise particles, fibers, or a mixture thereof. The reinforcing filler can have a mesh size of 30 to 5,000. In certain embodiments, the reinforcing filler has a mesh size of 50 to 5,000, 100 to 5,000, 300 to 5,000 or 500 to 5,000. In certain embodiments, the reinforcing filler is selected from the group consisting of wollastonite, E-glass fiber, quartz, and hydrophobic fumed silica; and the reinforcing filler has a mesh size of 500 to 5,000.

The compatibilizer can be selected from the group consisting of glycidyl methacrylate, EGMA, GMA, triethoxyvinylsilane, and MA. In certain embodiments, the compatibilizer is EGMA, GMA, triethoxyvinylsilane, or MA.

The antioxidant can be a phenol-based antioxidant. Exemplary antioxidants, include, but are not limited to, butylated hydroxytoluene, Irganox®1010, Irganox® 1076, Irganox® 1098, Irgafos® 168 or Irganox® B 225, and the like. In certain embodiments, the antioxidant is selected from the group consisting of:

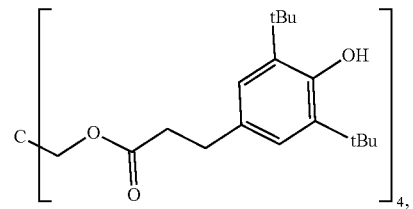

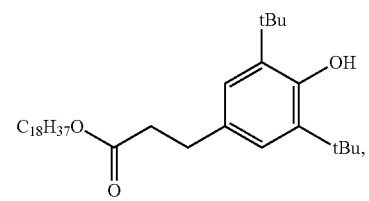

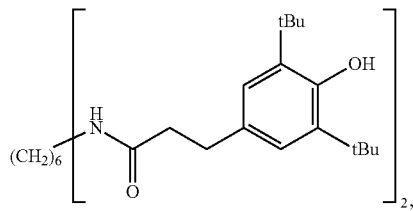

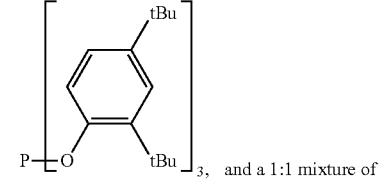, and a 1:1 mixture of

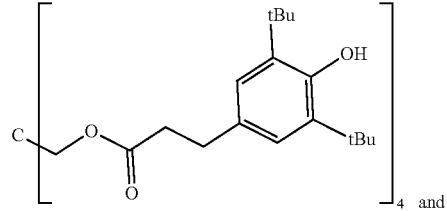 and

-continued

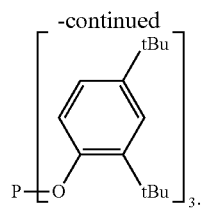

In certain embodiments, the energy absorbing composite comprises the thermoplastic resin and the dilatant in a weight ratio between 1:0.01 to 1:1, respectively. In certain embodiments, the energy absorbing composite comprises the thermoplastic resin and the dilatant in a weight ratio between 1:0.01 to 5:3; between 1:0.01 to 5:2; between 1:0.1 to 5:2; between 10:1 to 5:2; between 5:1 to 5:2; between 7:3 to 4:1; or between 10:3 to 5:2, respectively.

In certain embodiments, the energy absorbing composite comprises the thermoplastic resin, the dilatant, the compatibilizer, and the reinforcing filler in a weight ratio between 100:1:0.01:0.02 to 100:120:3:20, respectively. In certain embodiments, the energy absorbing composite comprises the thermoplastic resin, the dilatant, the compatibilizer, and the reinforcing filler are in a weight ratio between 100:1: 0.01:0.02 to 100:60:3:20; between 100:1:0.01:0.02 to 100: 40:3:20; between 100:10:0.01:0.02 to 100:40:3:20; between 100:10:0.01:2 to 100:40:3:8, respectively.

In certain embodiments, the energy absorbing composite comprises the thermoplastic resin, the dilatant, the compatibilizer, the reinforcing filler, and optionally the antioxidant in a weight ratio between 100:1:0.01:0.02:0 to 100:120:3: 20:2, respectively. In certain embodiments, the energy absorbing composite comprises the thermoplastic resin, the dilatant, the compatibilizer, the reinforcing filler, and the antioxidant in a weight ratio between 100:1:0.01:0.02:0 to 100:120:3:20:2; between 100:1:0.01:0.02:0 to 100:60:3:20: 2; between 100:10:0.01:0.02:0 to 100:40:3:20:2; between 100:10:0.01:2:0 to 100:40:3:8:2, respectively.

As demonstrated in the examples below, the energy absorbing efficiency of the energy absorbing composite can be improved by crosslinking the energy absorbing composite with a siloxane cross linker. The siloxane crosslinking reaction can be accomplished using conventional methods well known in the art. In certain embodiments, the energy absorbing composite is cross-linked in a hydrosilylation crosslinking step by reaction of the energy absorbing composite with a hydrosiloxane cross linker in the presence of a hydrosilylation catalyst.

Useful hydrosiloxane cross linkers generally include silicon hydride compounds having at least two SiH groups. These compounds react with carbon-carbon double bonds of unsaturated polymers in the presence of a hydrosilylation catalyst. Silicon hydride compounds that are useful in practicing the present invention include, but are not limited to, methyl hydrogen polysiloxanes, methyl hydrogen dimethylsiloxane copolymers, alkyl methyl polysiloxanes, bis(dimethylsilyl)alkanes, bis(dimethylsilyl)benzene, and mixtures thereof. In certain embodiments, the hydrosiloxane cross linker is a methylhydrosiloxane.

Typically, the hydrosiloxane cross linker is used at weight ratio relative to the thermoplastic resin between 0.01:1 to 0.05:1, respectively. In certain embodiments, the hydrosiloxane cross linker is used at weight ratio relative to the thermoplastic resin between 0.02:1 to 0.05:1; or 0.02:1 to 0.04:1, respectively.

The hydrosilylation crosslinking step can be conducted in the presence of a hydrosilylation catalyst. Hydrosilylation catalysts can include, but are not limited to, catalysts including transition metals of Group VIII. These metals include, but are not limited to, palladium, rhodium, and platinum, as well as complexes of these metals. Examples of the hydrosilylation catalysts include platinum group metals alone, such as platinum (including platinum black), platinum (0) catalysts, such as Karstedt's catalyst, rhodium and palladium; platinum chlorides, chloroplatinic acids and chloroplatinates, such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$, wherein n is an integer of 0 to 6. In certain embodiments, the catalyst is Karstedt's catalyst.

The hydrosilylation catalyst can be present between 5 and 500 ppm relative to the total weight of the thermoplastic resin, the dilatant, the compatibilizer, the reinforcing filler, and the optional antioxidant. In certain embodiments, the hydrosilylation catalyst can be present between 5 and 100 ppm; 5 and 50 ppm; 20 and 50 ppm; or 30 and 50 ppm relative to the total weight of the thermoplastic resin, the dilatant, the compatibilizer, the reinforcing filler, and the optional antioxidant.

The energy absorbing composite can be prepared by melt blending the thermoplastic resin, the dilatant, the compatibilizer, and optionally the antioxidant thereby forming the energy absorbing composite. In certain embodiments, the thermoplastic resin, the dilatant, the compatibilizer, and optionally the antioxidant are melt blended using an internal mixer at 80-250° C.

In certain embodiments, energy absorbing composite can be prepared by melt blending the thermoplastic resin, the dilatant, the compatibilizer, and optionally the antioxidant thereby forming an uncured energy absorbing composite; and combining a siloxane cross linker and a silylation catalyst thereby forming a crosslinked energy absorbing composite. In certain embodiments, the thermoplastic resin, the dilatant, the compatibilizer, and optionally the antioxidant are melt blended using an internal mixer at 80-250° C. thereby forming a uncured energy absorbing composite, and then the siloxane cross linker and the silylation catalyst are mixed with the uncured energy absorbing composite thereby forming a crosslinked energy absorbing composite.

Also provided herein are energy absorbing composites comprising: a thermoplastic resin, a core-shell polymer, and optionally an antioxidant, wherein the core-shell polymer comprises a dilatant in the core.

Figure 3:
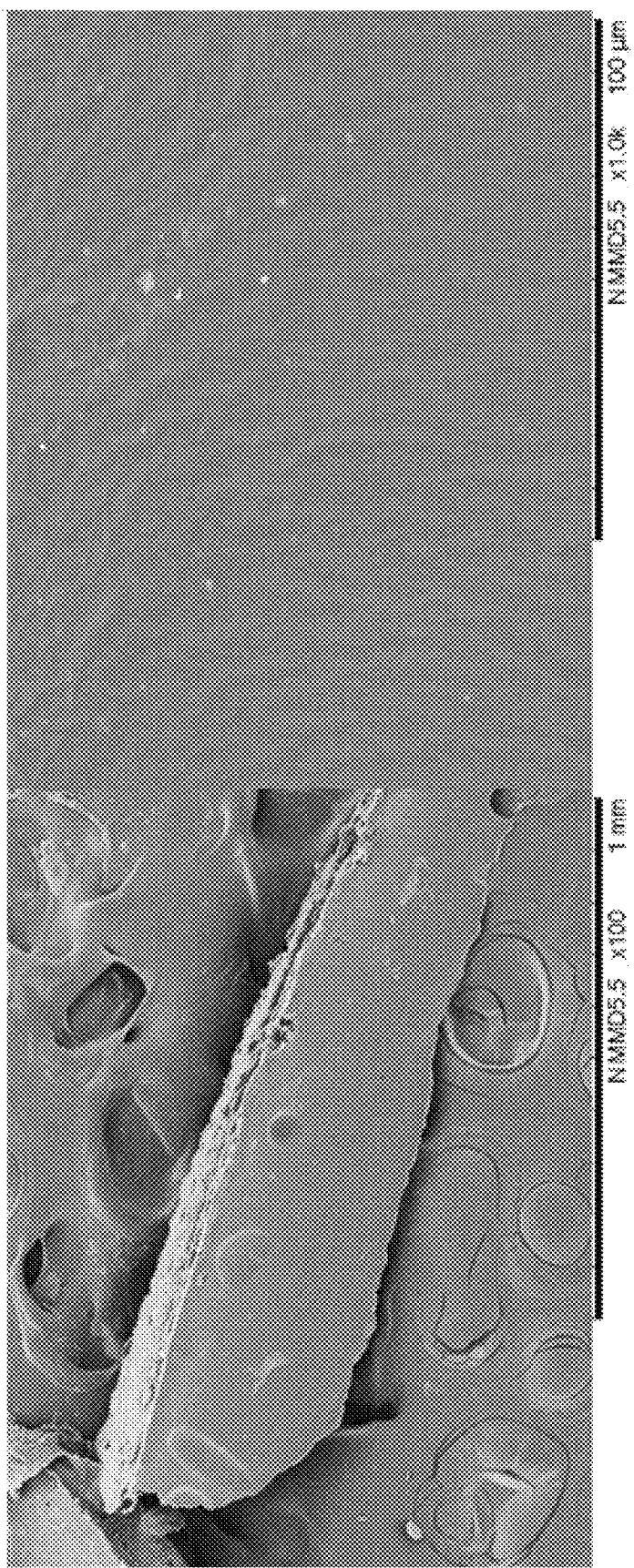
FIG. 3 depicts a SEM image of the cross section of pure SEBS (×100 and ×1,000 magnification).
Figure 4A:
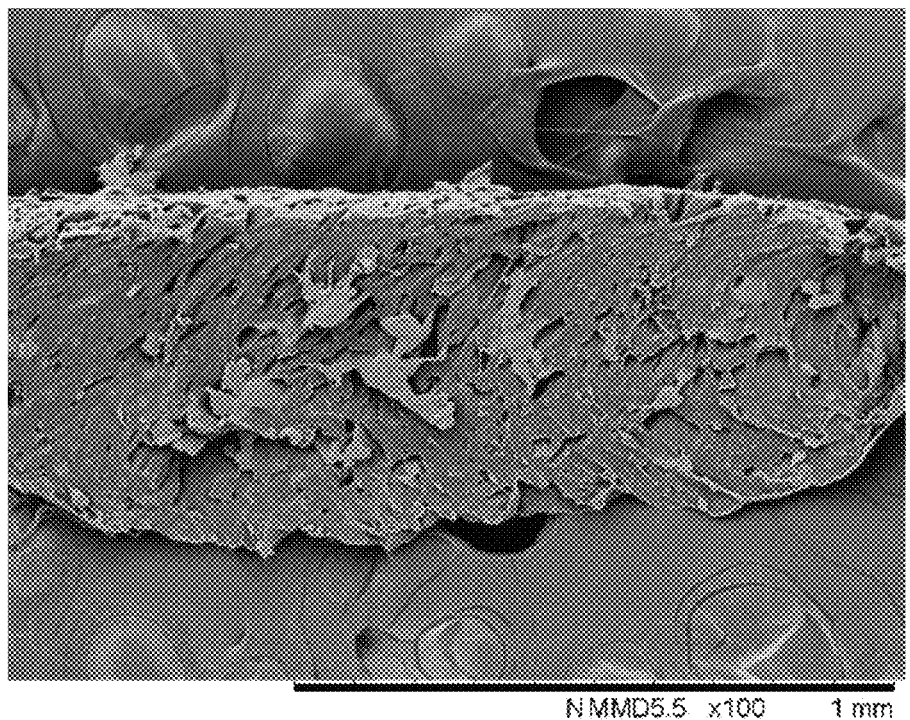
FIG. 4A depicts a SEM image of the cross section of a composite comprising SEBS and PBDMS (×100 magnification).
Figure 4B:
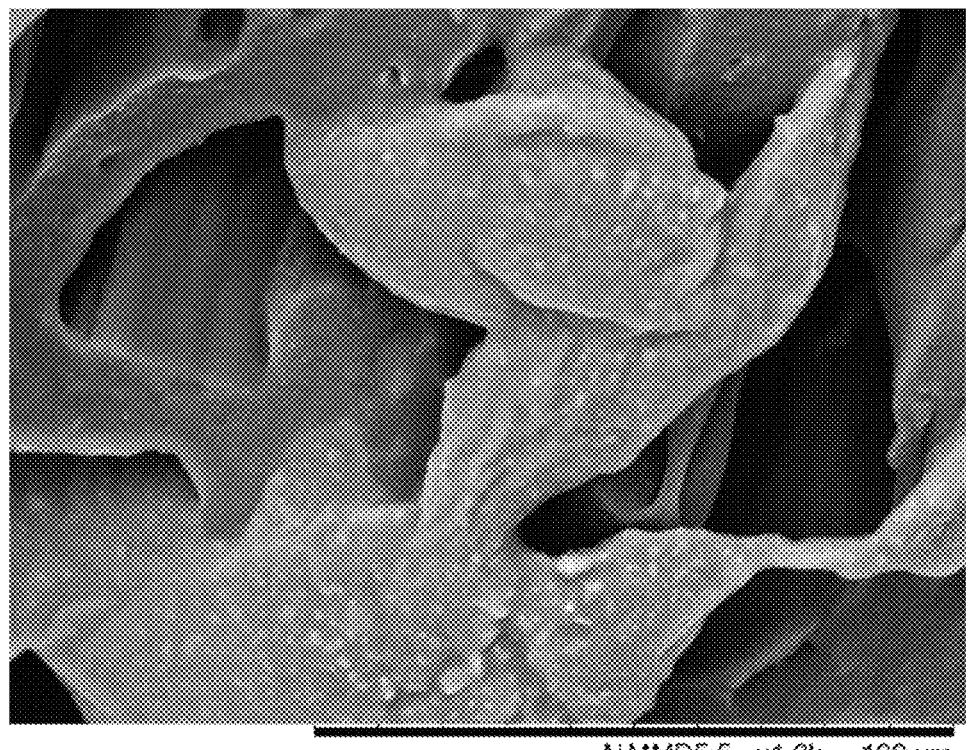
FIG. 4B depicts a SEM image of the cross section of a composite comprising SEBS and PBDMS (×1,000 magnification).
Figure 5A:
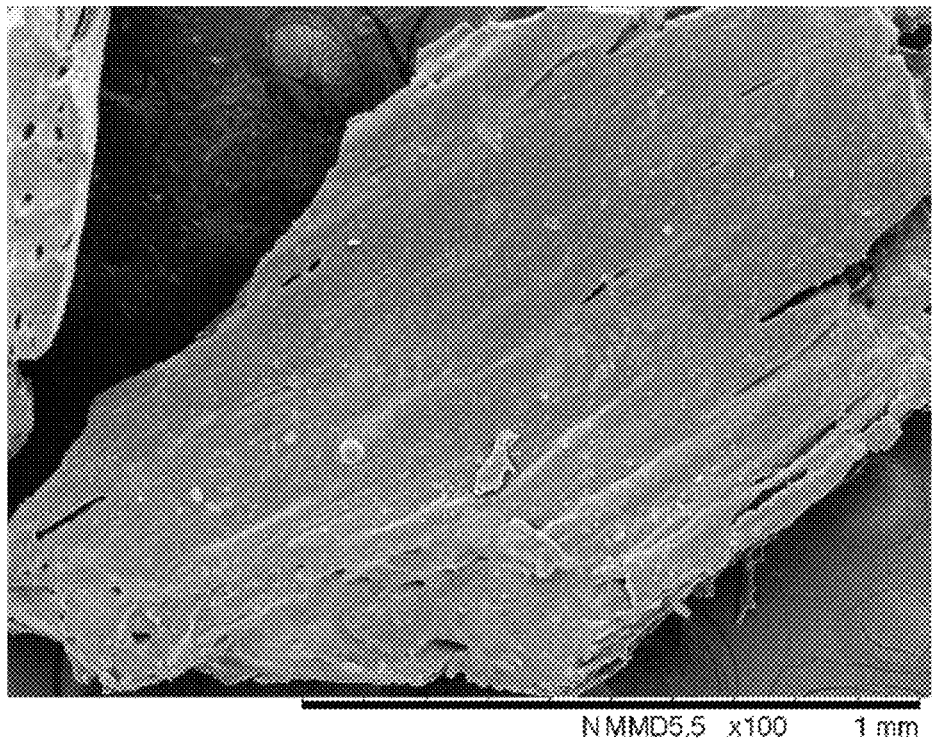
FIG. 5A depicts a SEM image of the cross section of a composite comprising SEBS and a PMMA core-shell comprising PBDMS (×100 magnification).
Figure 5B:
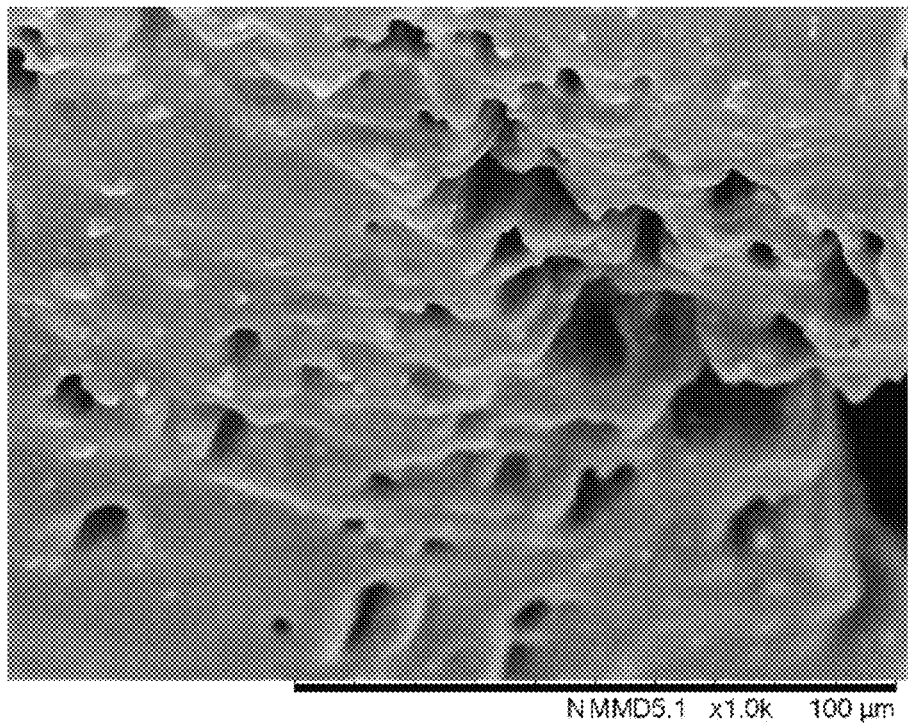
FIG. 5B depicts a SEM image of the cross section of a composite comprising SEBS and PMMA core-shell comprising PBDMS (×1,000 magnification).
Figure 6:
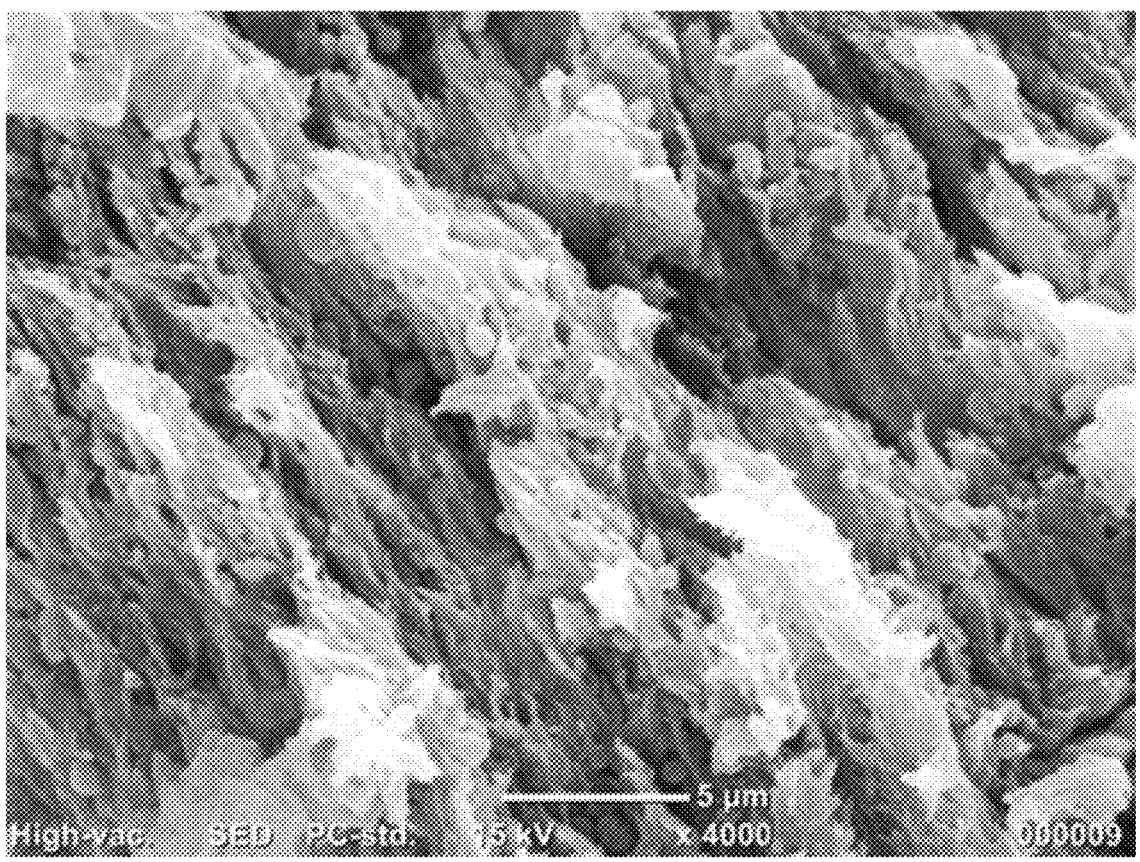
FIG. 6 depicts a SEM image of the cross section of a composite comprising PC and PMMA core-shell comprising PBDMS (×4,000 magnification).
Figure 7:
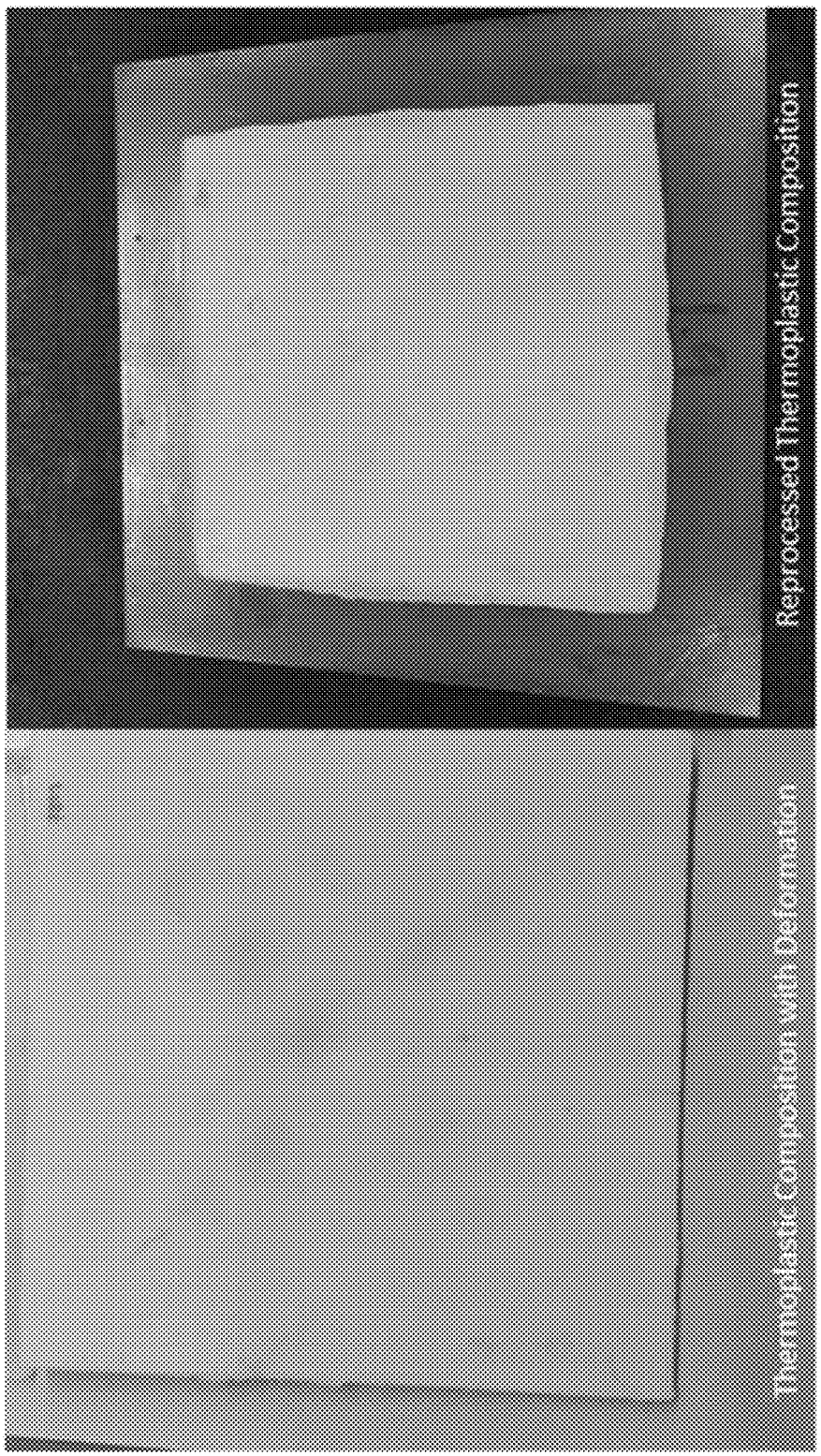
FIG. 7 depicts tests demonstrating the reprocessability of the energy absorbing composites described herein after deformation. (LEFT) PC-PBDMS the energy absorbing composite according to certain embodiments described herein after impact testing, plastic deformations can be observed. (RIGHT) PC-PBDMS the energy absorbing composite according to certain embodiments described herein after compression molding.

As demonstrated in FIGS. 3A, 3B, 4A, and 4B, energy absorbing composites comprising the dilatant inside of a core-shell polymer are more homogeneously blended. Additionally, as demonstrated in Table 8 in examples below, energy absorbing composites comprising the dilatant inside of a core-shell polymer can exhibit improved energy absorbing properties as compared with energy absorbing composites comprising just the dilatant.

Depending on the desired physical and chemical properties of the energy absorbing composite comprising the core-shell polymer, a person skilled in the art can select the appropriate thermoplastic resin. Exemplary thermoplastic resins include crystalline or semi-crystalline, or crystallizable, polyolefins, polyurethanes, polyimides, polyesters, poly(phenylene ether), polycarbonates, styrene-acrylonitrile copolymers, polyethylene, polyethylene terephthalate, polybutylene terephthalate, polystyrene, polystyrene derivatives, polyolefin-polystyrene copolymers (SBS, SEBS, etc.), polyphenylene oxide, polyoxymethylene, and polyolefin-vinyl acetate copolymers. In certain embodiments, the thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene, styrene, or mixtures thereof are also contemplated. The thermoplastic resin can comprise a branched polymer, a linear polymer, or a dendritic polymer. The thermoplastic resin can comprise a block, alternating, random, regiorandom, or regioregular polymer. The thermoplastic resin can comprise an isotactic polymer, syndiotactic polymer, atactic polymer, or a combination thereof.

In certain embodiments, the thermoplastic resin is selected from the group consisting of PC, styrene isoprene styrene (SIS), ABS, SEBS, SBS, PE (e.g., high density polyethylene), EVA, and combinations thereof.

The core-shell polymer can comprise a hydrophobic polymer. In certain embodiments, the hydrophobic polymer comprises repeating units selected from the group consisting of alkyl methacrylates, alkyl acrylates, polystyrene, allyl methacrylate, and combinations thereof. In certain embodiments, the core-shell polymer comprises a polymethylmethacrylate.

The core-shell polymer has an average diameter between 50 nm and 10 µm. In certain embodiments, the core-shell polymer has an average diameter between 50 nm and 5 µm, 100 nm and 5 µm, 500 nm and 5 µm, 1 µm and 5 µm, 1 µm and 4 µm, or 1 µm and 3 µm.

The dilatant can be a non-Newtonian material, such as a shear-thickening fluid. In certain embodiments, the dilatant is a silicone polymer, such as hydroxyl terminated dialkylsiloxane polymer. In certain embodiments, the dilatant is a borate cross-linked hydroxyl terminated dialkylsiloxane polymer. Exemplary dilatants include PBDMS and any silicon comprising any silicone containing borated PDMS. In certain embodiments, the dilatant is PBDMS prepared from 2,000 to 4,000 or 2,000 to 3,500 Dalton hydroxyl terminated dimethylsiloxane polymer.

The antioxidant can be a phenol-based antioxidant. Exemplary antioxidants, include, but are not limited to, butylated hydroxytoluene; a phenol-based oxidant sold under the trade name Irganox®1010, Irganox® 1076, Irganox® 1098, and the like sold by BASF SE; a phosphite based oxidant sold under the tradename Irgafos® 168 sold by BASF SE; or a mixture of a phenol-based oxidant and a phosphite-based oxidant sold under the tradename Irganox® B 225, and the like sold by BASF SE. In certain embodiments, the antioxidant is selected from the group consisting of:

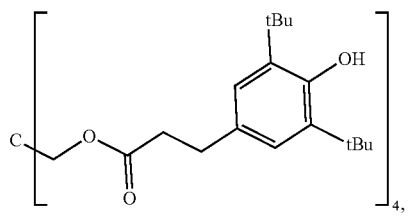

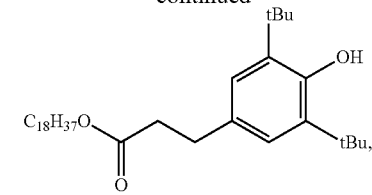

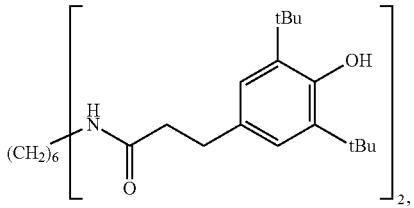

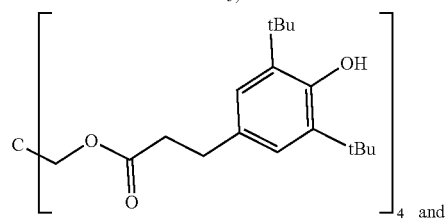, and a 1:1 mixture of

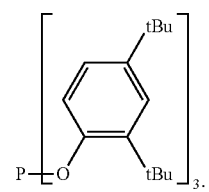

The core-shell polymer comprising the dilatant in the core can be prepared by mixing an oil phase and an aqueous phase under conditions facilitating a radical polymerization reaction, wherein the oil phase comprises an organic solvent comprising the dilatant, one or monomers, a peroxide initiator, and a surfactant; and the aqueous phase an aqueous solution comprising hydrophilic radical initiators (e.g. sulfuric acid initiators), and hydrophilic surfactants (e.g. Tweens).

The one or more monomers can be any hydrophobic olefinic monomer. In certain embodiments, the one or more monomers is selected from the group consisting of alkyl methacrylates (AMA), alkyl acrylates, polystyrene, allyl methacrylate, and combinations thereof. In certain embodiments, the one or more monomers is polymethylmethacrylate.

Peroxide initiators are generally selected from organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, benzoyl peroxide, lauroyl peroxide, dilauroyl peroxide, 2,5-dimethyl-2, 5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. In certain embodiments, the peroxide initiator is selected from the group consisting of azobisisobutyronitrile (AIBN), potassium persulfate, iron sulfate, or combinations thereof.

The surfactant can be a fatty acid ester of sorbitol surfactant (e.g., Tween® and/or Span), cetrimonium bromide (CTAB), sodium dodecyl sulfate (SDS), alkylphenol ethoxylate (Triton™ X-100 sold by Dow®), polyethylene glycol dodecyl ether (Brij), or combinations thereof.

The organic solvent can be an alkane, alcohol, or a haloalkane. In certain embodiments, the organic solvent is hexanes, isopropanol, dichloromethane, or a combination thereof.

The oil phase and the aqueous phase can be mixed vigorously, such as by using a homogenizer or under the action of ultrasonic irradiation. The radical polymerization step can be conducted at a temperature between 60-80° C. for between 4-8 hours or until the reaction has substantially stopped.

The core-shell polymer comprising the dilatant can melt blended with the thermoplastic resin, and optionally the antioxidant thereby forming the energy absorbing composite. In certain embodiments, the core-shell polymer comprising the dilatant and the thermoplastic resin are blended using an internal mixer at 150-210° C. for 5-20 minutes.

The energy absorbing composites described herein can be prepared by melt blending using any conventional method. In certain embodiments, melt blending may be conducted in machines such as, single or multiple screw extruders, Buss kneader, Eirich mixers, Henschel, helicones, Ross mixer, Banbury mixer, roll mills, molding machines, such as injection molding machines, vacuum forming machines, blow molding machines, or the like, or combinations comprising two or more the foregoing machines. In certain embodiments, melt blending is performed in a single screw or twin screw extruder or using an internal mixer.

EXAMPLES

Materials: These are the thermoplastic resins used in the preparation of the composites described herein. Polycarbonate (PC, Teijin Limited: Panlite L-1250Y, Formosa Chemicals and Fiber: TAIRILITE AC3900); Thermoplastic Polyurethane (TPU, BASF, model 75A); Ethylene vinyl acetate copolymer 28% Vinyl Acetate (EVA, Dupont-Mitsui EVAFLEX P2805; Dupont-Mitsui EVAFLEX 220W); Acrylonitrile Butadiene Styrene Copolymer (ABS, Chi Mei Corporation, ChiMei PA709). Polyborodimethylsiloxane (PBDMS) were prepared with different hydroxyl-terminated silicone oil precursors and molecular weights ranging from (2000-43000 Daltons). In addition, PBDMS with different inorganic fillers such as: Wollastonite (2500 mesh), E-Glass Fiber (800 mesh), Quartz (5000 mesh), Hydrophobic Fumed Silica (R8200, Surface Area: 160 m2/g) were also prepared. Compatibilizers used in this work are: Poly (ethylene-co-methyl acrylate-co-glycidyl methacrylate) (EGMA), Glycidyl methacrylate (GMA), triethoxyvinylsilane (A172), and maleic anhydride (MA). Antioxidants used in this work are: Irganox®1010, and Irgafos®168. The curing agent and hydrosilylation catalyst used in this work are Methylhydrosiloxane 6-7%, and Karstedt's catalyst solution 1500 ppm.

Instruments: All non-core-shell thermoplastic compositions were mixed and prepared using an internal mixer at different temperature depending on the thermoplastic resin used. The thermoplastic composites were pressed and molded via a hot-compression molder.

Pre-synthesis: All thermoplastic resins were dried in a vacuum oven at least for 4 hours prior to mixing.

Energy Absorbing Composites Including Compatibilizer

Preparation of PC-PBDMS Composite: In a typical synthesis, polycarbonate resin (100 parts) and antioxidants (0-0.5 parts of resin) were poured inside the internal mixer chamber (210° C., 60 rpm). The resin and antioxidant were mixed for 5 minutes. Followed by the addition of polyborodimethylsiloxane (0-120 parts of resin) and compatibilizer (0-5 parts of resin) inside the internal mixer chamber and the composite were stirred for another 5 minutes. Afterwards, the curing agent (0-5 parts of resin) was added in the internal mixer and stirred for an additional 1 minute. Finally, the catalyst (0-100 ppm of polymer's total weight) was added and was stirred for 5-30 minutes, depending on the stabilization of the internal mixer's torque. The as-prepared samples were pressed and formed to 10 cm×10 cm×0.7 mm, 10 cm×10 cm×1.9 mm square sheet and 5 cm diameter×4 mm thickness circular sheet under 210° C. for 5 minutes.

Preparation of M-PBDMS Composite (where M=TPU, ABS, EVA): The preparation of the composite is similar with PC-PBDMS except the resin used can be TPU, ABS, or EVA and the corresponding internal mixer temperatures are TPU: 180° C., ABS: 190° C., and EVA: 90° C. The as-prepared sample were also pressed and formed to 10 cm×10 cm×0.7 mm, 10 cm×10 cm×1.9 mm square sheet and 5 cm diameter×4 mm thickness circular sheet.

Impact Energy Absorption Characterization: The film samples impact energy absorption were tested using a ball-drop tester. The drop height is 450 mm from the sensor and the ball weights are: 126.5, 533.3, and 1041.4 grams, which correspond to 0.56, 2.35, and 4.59 J.

Tensile Strength and Elongation at Break Characterization: The film samples were cut and shaped into a dumbbell shaped using a laser cutter. The dumbbell shaped samples were tested for its tensile strength and elongation at break using an MTS Tensile Strength tester.

The polyborodimethylsiloxane is prepared from hydroxy-terminated silicone oil with molecular weight of 2000-4000 Daltons. The preferred amount of components are:

Polyborodimethylsiloxane: 25 parts of resin weight, (2000-3500 MW Hydroxyl-terminated Silicone Oil); Inorganic Reinforcing Filler (Optional): 20 parts of PBDMS weight, E-Glass Fiber (800 mesh); Compatibilizer: 2 parts of resin weight, Poly(ethylene-co-methyl acrylate-co-glycidyl methacrylate; Antioxidants: 1 part of resin weight; Curing agent: 3 parts of resin weight; and Catalyst: 40 ppm of the total component.

Impact Energy Absorption

TABLE 1

Summary of Impact Absorption Property of Selected Polycarbonate - PBDMS Composite

| SAMPLE | PEAK TRANSMITTED FORCE @ 2.35 J (0.7 MM) | ENERGY ABSORPTION EFFICIENCY |
|---|---|---|
| BLANK | 7274N | 0 |
| PANLITE L-1250Y | 5432N | 0 |
| PREFERRED EMBODIMENT | 4526N | 16.7% |
| PREFERRED EMBODIMENT (NON-CURED) | 4588N | 15.5% |

TABLE 1-continued

Summary of Impact Absorption Property of Selected Polycarbonate - PBDMS Composite

| SAMPLE | PEAK TRANSMITTED FORCE @ 2.35 J (0.7 MM) | ENERGY ABSORPTION EFFICIENCY |
|---|---|---|
| 10 PARTS PBDMS ONLY (NON-CURED) | 4944N | 9.0% |
| 20 PARTS PBDMS ONLY(NON-CURED) | 4815N | 11.4% |

Table 1 presents selected impact absorption data of PC and PC-PBDMS composite. It can be seen from Table 1, the Preferred Embodiment of the invention has a 16.7% higher impact energy absorption efficiency compared with pure polycarbonate. When the Preferred Embodiment and other composition does not undergo hydrosilylation reaction, the energy absorption is lower and has an efficiency of 15.5%, 9.0%, and 11.4%. We also observed in the table that increasing the amount of polyborodimethylsiloxane (PBDMS) on the composition increases its energy absorption efficiency, 10 parts vs 20 parts.

TABLE 2

Summary of Impact Absorption Property of 18000 M.W. PC-PBDMS Precursor Composite

| SAMPLE | PEAK TRANSMITTED FORCE @ 2.35 J (0.7 MM) | ENERGY ABSORPTION EFFICIENCY |
|---|---|---|
| PANLITE L-1250Y | 5432N | 0 |
| 10% DILATANT | 4787N | 11.9% |
| 20% DILATANT | 4596N | 15.4% |
| 25% DILATANT | 4319N | 20.5% |
| 30% DILATANT | 3987N | 26.6% |
| 20% DILATANT COMPATIBLIZED-CURED | 3612N | 33.5% |
| 25% DILATANT COMPATABILIZED-CURED | 4236N | 22.0% |
| PREFERRED EMBODIMENT | 4526N | 16.7% |

Table 2 presents impact absorption data of composites of PC and PBDMS, which is prepared from a 18,000 Dalton molecular weight hydroxyl-terminated silicone oil. Based on the table, the higher molecular weight precursor PBDMS composite has better efficiency compared with the PBDMS made from 2000-3500 Dalton silicone oil. In addition, curing the composite yields better energy absorption (15.4% vs. 33.5%), but sample failure and cracks were also observed. Although the energy absorption efficiency using higher molecular weight PBDMS precursor is better than lower molecular weight, the surface of the high molecular weight composite felt sticky and may hinder its application on commercial products.

TABLE 3

Summary of Impact Energy Absorption and Tensile Strength of PC-PBDMS Composite

| SAMPLE | ENERGY ABSORPTION EFFICIENCY | TENSILE STRENGTH AT YIELD |
|---|---|---|
| PANLITE L-1250Y | 0% | 57.5 ± 3.6 MPa |
| 10% DILATANT | 9.0% | 46.8 ± 1.8 MPa |
| 20% DILATANT | 11.4% | 34.7 ± 1.2 MPa |
| 20% DILATANT CURED* | 17.1% | 32.0 ± 1.2 MPa |
| 10% REINFORCED DILATANT | 6.7% | 53.1 ± 6.5 MPa |
| 20% REINFORCED DILATANT | 8.9% | 48.9 ± 0.5 MPa |
| 20% REINFORCED DILATANT COMPATIBILIZED-CURED | 15.5% | 36.6 ± 0.5 MPa |
| 25% REINFORCED DILATANT COMPATIBILIZED-CURED | 17.8% | 35.6 ± 0.5 MPa |
| 60% DILATANT | 49.0% | 0.4 ± 0.1 MPa |
| 60% DILATANT COMPATIBILIZED-CURED | 44.0% | 3.0 ± 0.8 MPa |

*Glycidyl methacrylate was used as the compatibilizer instead of poly (ethylene-co-methyl acrylate-co-glycidyl methacrylate.

Table 3 shows the comparison of composites made from non-reinforced and reinforced PBDMS. E-Glass fiber (800 mesh, 20% weight of PBDMS) was used as the reinforcing filler of the composite. As shown in the table, the addition of PBDMS increases its impact energy absorption efficiency but the tensile strength of the composite decreases relative to its pure thermoplastic property. The addition of E-Glass fiber decreases the loss of tensile strength of the composite due to PBDMS inclusion. For non-reinforced and reinforced dilatant, curing the composite increases its energy absorption efficiency but the tensile strength further decreases. With the exception of compositions with 60% weight dilatant, curing of non-reinforced dilatant yields a 2.11% energy absorption gain per MPa loss in tensile strength, while a reinforced dilatant yields 0.54% energy absorption gain per MPa loss in tensile strength.

TABLE 4

Summary of Impact Energy Absorption of Thermoplastic Polyurethane and PBDMS Composite

| SAMPLE | PEAK TRANSMITTED FORCE @ 2.35 J (4 MM) | ENERGY ABSORPTION EFFICIENCY | SHORE HARDNESS |
|---|---|---|---|
| BLANK | 7274N | 0% | NA |
| BASF TPU 75A | 2299N | 0% | 38 |
| 35% DILATANT | 2037N | 11.4% | 26 |
| 35% WOLLASTONITE REINFORCED DILATANT | 2026N | 11.9% | 40 |
| 35% QUARTZ REINFORCED DILATANT | 1969N | 14.4% | 39 |
| 35% FUMED SILICA REINFORCED DILATANT | 2165N | 1.5% | 37 |

*The amount of reinforcing fillers is 20% weight of the dilatant.

Table 4 shows the impact absorption of TPU with 35% non-reinforced and reinforced dilatant. It can be seen from the table that inclusion of dilatant on TPU improves its impact energy absorption efficiency. Addition of inorganic reinforcing fillers further improves the energy absorption efficiency with the exception of fumed silica. Quartz filler showed the highest enhancement on energy absorption efficiency. The shore hardness of reinforced composite is similar with TPU.

TABLE 5

Summary of Impact Energy Absorption of Ethylene Vinyl Acetate Co-polymer and PBDMS Composite.

| SAMPLE | PEAK TRANSMITTED FORCE @ 0.56 (4 MM) | ENERGY ABSORPTION EFFICIENCY | PEAK TRANSMITTED FORCE @ 2.35 J (4 MM) | ENERGY ABSORPTION EFFICIENCY | PEAK TRANSMITTED FORCE @ 4.59 (4 MM) | ENERGY ABSORPTION EFFICIENCY |
|---|---|---|---|---|---|---|
| BLANK | 1678 N | 0% | 7270 N | 0% | 11586 N | 0% |
| EV AFL EX 220 W | 775 N | 0% | 2518 N | 0% | 4494 N | 0% |
| EV AFL EX P2805 | 793 N | 0% | 2534 N | 0% | 4609 N | 0% |
| EV AFL EX 220W WITH 50 PARTS PBDMS | 690 N | 10.9% | 2321 N | 7.8% | 4248 N | 5.5% |
| EV AFL EX P2805 WITH 50 PARTS PBDMS | 723 N | 8.8% | 2350 N | 7.3% | 4260 N | 7.6% |

Table 5 presents the impact absorption data of EVA-PBDMS composite. Similar with other thermoplastic, the energy absorption of the composite is enhanced upon addition of PBDMS. Two different EVA resins were used EVA-FLEX 220W and P2805. The impact absorption is similar for both resins and their corresponding composite, as shown in their peak transmitted force.

Energy Absorbing Composites Including Core-Shell dilatant

In a typical synthesis, core-shell PBDMS and thermoplastics are blended by internal mixer at 150-210° C. for 5-20 min. The as-prepared samples were pressed and formed sheet under 150-210° C. for 5 minutes.

TABLE 6

Impact protection performance test results for core-shell PBDMS/PC composite (weight ratio 20:100; Sample thickness 2.5 mm)

| IMAPCT FORCE | TRASMITTED FORCE (PLAIN PC) | TRASMITTED FORCE (CORE-SHELL PBDMS/PC) | REDUCTION PERCENTAGE |
|---|---|---|---|
| 1600N | 1506N | 1009N | 33% |

As shown in Table 7, under the impact force of 1660 N, the transmitted force for plain PC is 1506 N, while the transmitted force for the core-shell SPM/PC is 1009 N. The data indicates that impact protection performance of core-shell PBDMS/PC is obviously better than plain PC sample.

TABLE 7

Impact protection performance test results for core-shell PBDMS/ABS composite (weight ratio 20:100; Sample thickness 2.5 mm)

| IMAPCT FORCE | TRASMITTED FORCE (PLAIN ABS) | TRASMITTED FORCE (CORE-SHELL PBDMS/ABS) | REDUCTION PERCENTAGE |
|---|---|---|---|
| 1600N | 1454N | 1313N | 9.7% |
| 6790N | 4439N | 3386N | 23.7% |

The data indicates that impact protection performance of core-shell PBDMS/ABS is obviously better than plain ABS sample.

TABLE 8

Impact protection performance test results for core-shell PBDMS/other composite (weight ratio 40:100; Sample thickness 2.5 mm, impact force is 11,500N).

| THERMO-PLASTIC MATRIX | FORCE REDUCTION PERCENTRAGE | | |
|---|---|---|---|
| | WITHOUT ADDITIVE | PBDMS | CORE-SHELL PBDMS |
| EVA | 62.6% | 62.6% | 62.6% |
| SBS | 17.7% | 35.3% | 30.8% |
| SEBS | 54.1% | 58.2% | 58.1% |
| HDPE | 52.0% | 52.7% | 57.1% |

As shown in table 8, the addition of core-shell PBDMS has positive effect on the improvement of impact protection performance. For some thermoplastic matrix like HDPE, the improvement of core-shell PBDMS is better than pure PBDMS.

What is claimed is:

1. An energy absorbing composite comprising: a thermoplastic resin, a core-shell polymer comprising a dilatant in the core of the core-shell polymer, a compatibilizer, a reinforcing filler, and optionally an antioxidant.

2. The composite of claim 1, wherein the thermoplastic resin is selected from the group consisting of polycarbonate (PC), polyamide (PA), thermoplastic polyester, thermoplastic polyurethane (TPU), acrylonitrile butadiene styrene (ABS), styrene-ethylene-butylene-styrene (SEBS), styrene-butadiene-styrene (SBS), polyethylene (PE), ethylene vinyl acetate co-polymer (EVA), polypropylene (PP), and combinations thereof.

3. The composite of claim 2, wherein the dilatant is polyborodimethylsiloxane (PBDMS), the reinforcing filler is fumed silica, E-glass fiber, wollastonite, quartz, hydrophobic fumed silica, diatomaceous earth, or calcium carbonate, and the antioxidant is a phenolic antioxidant.

4. The composite of claim 3, wherein the thermoplastic resin; the dilatant; the compatibilizer, the reinforcing filler, and the antioxidant are present in the composite in a weight ratio between 100:10:1:1:0.5 to 100:40:3:12:1.5, respectively.

5. The composite of claim 4, further comprising a siloxane cross linker, wherein the thermoplastic resin and cross linker are present in the composite in a weight ratio between 100:1 to 100:5.

6. The composite of claim 1, wherein the dilatant is a silicon polymer, a hydroxyl terminated dialkylsiloxane polymer, a borate cross-linked hydroxyl terminated dialkylsiloxane polymer, a silicone polymer comprising borated polydimethylsiloxane, polyborodimethylsiloxane (PBDMS), or a combination thereof.

7. The composite of claim 1, wherein the reinforcing filler is selected from the group consisting of fumed silica, E-glass fiber, wollastonite, quartz, hydrophobic fumed silica, diatomaceous earth, calcium carbonate, and combinations thereof.

8. The composite of claim 1, wherein the compatibilizer is selected from the group consisting of poly (ethylene-co-methyl acrylate-co-glycidyl methacrylate) (EGMA), glycidyl methacrylate (GMA), triethoxyvinylsilane, and maleic anhydride (MA).

9. The composite of claim 1, further comprising a siloxane cross linker.

10. The composite of claim 1, wherein the thermoplastic resin, the dilatant, the compatibilizer, the reinforcing filler, and the antioxidant are present in the composite in a weight ratio between 100:1:0.01:0.02:0 to 100:120:3:20:2, respectively.

11. The composite of claim 1, wherein the thermoplastic resin, the dilatant, the compatibilizer, the reinforcing filler, and the antioxidant are present in the composite in a weight ratio between 100:10:1:1:0.5 to 100:40:3:12:1.5, respectively.

12. The composite of claim 1, wherein the dilatant is a silicon polymer, a hydroxyl terminated dialkylsiloxane polymer, a borate cross-linked hydroxyl terminated dialkylsiloxane polymer, a silicone polymer comprising borated polydimethylsiloxane, polyborodimethylsiloxane (PBDMS), or a combination thereof.

13. The composite of claim 12, wherein the thermoplastic resin is polycarbonate, thermoplastic polyurethane, acrylonitrile butadiene styrene (ABS), styrene-ethylene-butylene-styrene (SEBS), styrene-butadiene-styrene (SBS), polyethylene, ethylene vinyl acetate co-polymer, or combinations thereof.

14. The composite of claim 12, wherein the shell comprises a hydrophobic polymer comprising repeating units selected from the group consisting of an alkyl methacrylate, an alkyl acrylate, polystyrene, allyl methacrylate, and combinations thereof.

15. The composite of claim 14, wherein the hydrophobic polymer present in the shell of the core-shell polymer and the PBDMS present in the core of the core-shell polymer are present in the composite in a weight ratio between 1:1 and 5:1, respectively.

16. The composite of claim 15, wherein the core-shell polymer comprising PBDMS is present in the composite in a weight percentage up 50% by weight.

17. The composite of claim 1, wherein the core-shell polymer has an average diameter between 50 nm and 10 µm.

18. A method of preparing the composite of claim 1, the method comprising: melt mixing the thermoplastic resin, the core-shell polymer comprising the dilatant in the core of the core-shell polymer, the compatibilizer, the reinforcing filler, and optionally the antioxidant thereby forming the composite.

19. The method of claim 18, further comprising the step of mixing the dilatant, hydrophobic monomers, and a radical initiator thereby forming the core-shell polymer.

* * * * *